(12) United States Patent
Ivanov et al.

(10) Patent No.: US 10,067,738 B2
(45) Date of Patent: Sep. 4, 2018

(54) DEVICE CONTROL BASED ON ITS OPERATIONAL CONTEXT

(71) Applicant: Motorola Mobility LLC, Chicago, IL (US)

(72) Inventors: Plamen A Ivanov, Schaumburg, IL (US); Kevin J Bastyr, Milwaukee, WI (US); Mark A Jasiuk, Chicago, IL (US); Seungyoon Lee, Evanston, IL (US); John Ross Meloney, Wheaton, IL (US); Snehitha Singaraju, Naperville, IL (US)

(73) Assignee: Motorola Mobility LLC, Chicago, IL (US)

( * ) Notice: Subject to any disclaimer, the term of this patent is extended or adjusted under 35 U.S.C. 154(b) by 208 days.

(21) Appl. No.: 14/992,503

(22) Filed: Jan. 11, 2016

(65) Prior Publication Data
US 2017/0199721 A1    Jul. 13, 2017

(51) Int. Cl.
*G06F 3/16* (2006.01)

(52) U.S. Cl.
CPC .................................. *G06F 3/167* (2013.01)

(58) Field of Classification Search
CPC ........... G06F 2200/1637; G06F 3/0346; G06F 3/167; G06F 3/01
See application file for complete search history.

(56) References Cited

U.S. PATENT DOCUMENTS

| 2013/0053007 A1* | 2/2013 | Cosman | G06F 3/017 455/414.3 |
| 2014/0096083 A1* | 4/2014 | Kim | G06F 3/04842 715/835 |
| 2015/0029095 A1* | 1/2015 | Gomez | G06F 3/017 345/156 |
| 2016/0062635 A1* | 3/2016 | Feit | G06F 3/04883 715/765 |

* cited by examiner

*Primary Examiner* — Abbas Abdulselam
(74) *Attorney, Agent, or Firm* — Miller, Matthias & Hull LLP

(57) ABSTRACT

Systems and methods for controlling a portable electronic communication device use device operational context to provide user trigger or command input. When user input is received from a user of the device, a set of user input options is selected based on an operational context of the device, including an identification of at least one running application. Each user input option is associated with a device action, and the received user input is mapped to a matching user input option within the selected set of user input options. The device action associated with the matching user input option is then executed.

20 Claims, 4 Drawing Sheets

DEVICE CONTROL BASED ON ITS OPERATIONAL CONTEXT

TECHNICAL FIELD

The present disclosure is related generally to mobile communication devices, and, more particularly, to a system and method for contextualizing available user input options in a mobile communication device.

BACKGROUND

As mobile devices continue to shrink in size and weight, voice command interface systems are supplementing and supplanting graphical user interface (GUI) systems for many operations. However, voice trigger and command recognition methods remain unacceptably inaccurate for a variety of reasons. The sources of inaccurate operation include the presence of noise, unusual spoken accents and unfamiliar speaker's voices.

While the present disclosure is directed to a system that can eliminate certain shortcomings noted in or apparent from this Background section, it should be appreciated that such a benefit is neither a limitation on the scope of the disclosed principles nor of the attached claims, except to the extent expressly noted in the claims. Additionally, the discussion of technology in this Background section is reflective of the inventors' own observations, considerations, and thoughts, and is in no way intended to accurately catalog or comprehensively summarize the art currently in the public domain. As such, the inventors expressly disclaim this section as admitted or assumed prior art. Moreover, the identification herein of a desirable course of action reflects the inventors' own observations and ideas, and should not be assumed to indicate an art-recognized desirability.

SUMMARY

In keeping with an embodiment of the disclosed principles, a portable electronic communication device includes a user input receiver that is at least one of a textual input receiver and an audible input receiver, as well as a user application running on the device. In various embodiments, other sensors may be used addition ally or alternatively to receive user input, e.g., a camera, an accelerator, a thermal sensor, a gyro, an IR sensor and so on. A processor receives and interprets user input by comparing the received user input to one or more application-specific user input options when the user application is active. When the user application is running in background, the processor compares the received user input to one or more device-specific user input options. Finally, an action associated with any input option matching the received user input is executed by the processor.

In another embodiment, a method of controlling operation of a portable electronic communication device is provided. In this embodiment, user input is received from a user of the device, and a set of user input options is selected based on an operational context of the device. Each user input option is associated with a device action, and the operational context of the device includes an identification of at least one running application. The received user input is mapped to a matching user input option within the selected set of user input options and the device action associated with the matching user input option is executed.

In yet another embodiment, a method of controlling operation of a portable communication device is provided. Within this embodiment, an operational context of the device is determined, the operational context including an identification of at least one running application and an indication of whether the at least one running application is active or is running in the background. An application-specific set of user input options is determined for each running application and an applicable set of user input options is selected based on the device operational context. When user input is received it is interpreted based on the applicable set of user input options.

Other features and aspects of embodiments of the disclosed principles will be appreciated from the detailed disclosure taken in conjunction with the included figures.

BRIEF DESCRIPTION OF THE SEVERAL VIEWS OF THE DRAWINGS

While the appended claims set forth the features of the present techniques with particularity, these techniques, together with their objects and advantages, may be best understood from the following detailed description taken in conjunction with the accompanying drawings of which:

DETAILED DESCRIPTION

Figure 1:
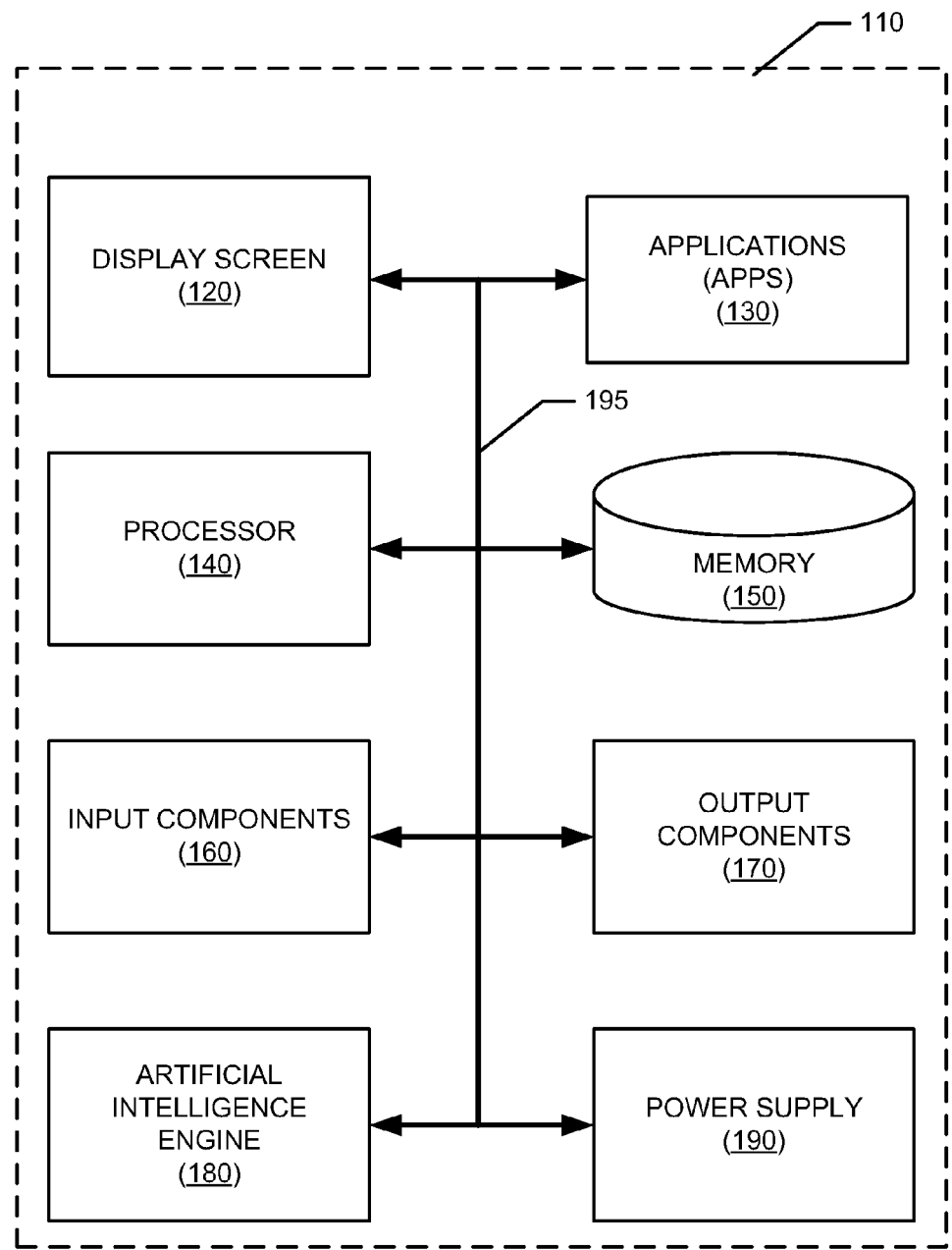
FIG. 1 is a simplified schematic of an example configuration of device components with respect to which embodiments of the presently disclosed principles may be implemented.

Before presenting a fuller discussion of the disclosed principles, an overview is given to aid the reader in understanding the later material. As noted above, voice trigger and command recognition techniques suffer from inaccuracy for a variety of reasons, including the presence of noise, the presence of accents that the VR (voice recognition) engine is not trained for, or the presence of a voice for which the VR engine has not been trained.

A "trigger" for a device is an action by a user or users, or the recognition of such an action, that serves as a "wake-up" call for the device. In other words, recognition of the trigger causes the device to enter an input mode to await a command. A voice trigger uses pre-defined voiced content to "wake-up" the device, in order to invoke subsequent action. Invoking a desired action on the portable device via voice command is therefore a two-step process: in the first step, the portable electronic device is prepared to receive input via the voiced trigger, and in the second step, the device receives, interprets and executes a voiced command. Although triggers and commands will generally be referred to herein in the context of audible signals, it should be noted that such may be either vocal or non-vocal. Vocal command includes words spoken by the user, or other intentionally produced audio inputs. Non-vocal commands can include gestures, mechanical input, camera input, or other sensor input.

In addition to trigger and command accuracy improvements, an embodiment of the disclosed principles allows the device to act without a prior wake-up call. In other words, in this embodiment, the trigger and command are combined in order to facilitate device control, based on operational context. Herein, the phrase "operational context" refers to a current state of use of the device. Such combined activation may be especially beneficial in circumstances where the user is, for example, already interacting with the device or an application in the device, or after the device's operational context is switched to a specific application from another.

Similarly, a user may for example switch among multiple simultaneously open apps, switch among and invoke non-active apps, or use other capabilities of the device itself contained within the operating system. Vocal or non-vocal commands may be appropriate based on the operational context. For example when the device is in a video-capture mode, it may be more appropriate to trigger and control the device using out of frame gestures, as opposed to using vocal cues (which would otherwise be recorded on the audio track of the video). In general, the ability to configure trigger or command utterances or actions to the context of the device allows various embodiments of the disclosed principles to provide a more efficient interface for the user.

With this overview in mind, and turning now to a more detailed discussion in conjunction with the attached figures, the techniques of the present disclosure are illustrated as being implemented in a suitable computing environment. The following device description is based on embodiments and examples of the disclosed principles and should not be taken as limiting the claims with regard to alternative embodiments that are not explicitly described herein. Thus, for example, while FIG. 1 illustrates an example mobile device within which embodiments of the disclosed principles may be implemented, it will be appreciated that other device types may be used.

The schematic diagram of FIG. 1 shows an exemplary component group 110 forming part of an environment within which aspects of the present disclosure may be implemented. In particular, the component group 110 includes exemplary components that may be employed in a device corresponding to the first device and/or the second device. It will be appreciated that additional or alternative components may be used in a given implementation depending upon user preference, component availability, price point, and other considerations.

In the illustrated embodiment, the components 110 include a display screen 120, applications (e.g., programs) 130, a processor 140, a memory 150, one or more input components 160 (user input receiver) such as speech and text input facilities (audible input receiver and textual input receiver respectively), and one or more output components 170 such as text and audible output facilities, e.g., one or more speakers. In an embodiment, the input components 160 include a physical or virtual keyboard maintained or displayed on a surface of the device. In various embodiments motion sensors, proximity sensors, camera/IR sensors and other types of sensors are used collect certain types of input information such as user presence, user gestures and so on.

The processor 140 may be any of a microprocessor, microcomputer, application-specific integrated circuit, and like structures. For example, the processor 140 can be implemented by one or more microprocessors or controllers from any desired family or manufacturer. Similarly, the memory 150 may reside on the same integrated circuit as the processor 140. Additionally or alternatively, the memory 150 may be accessed via a network, e.g., via cloud-based storage. The memory 150 may include a random access memory (i.e., Synchronous Dynamic Random Access Memory (SDRAM), Dynamic Random Access Memory (DRAM), RAMBUS Dynamic Random Access Memory (RDRM) or any other type of random access memory device or system). Additionally or alternatively, the memory 150 may include a read only memory (i.e., a hard drive, flash memory or any other desired type of memory device).

The information that is stored by the memory 150 can include program code associated with one or more operating systems or applications as well as informational data, e.g., program parameters, process data, etc. The operating system and applications are typically implemented via executable instructions stored in a non-transitory computer readable medium (e.g., memory 150) to control basic functions of the electronic device. Such functions may include, for example, interaction among various internal components and storage and retrieval of applications and data to and from the memory 150.

Further with respect to the applications 130, these typically utilize the operating system to provide more specific functionality, such as file system services and handling of protected and unprotected data stored in the memory 150. Although some applications may provide standard or required functionality of the user device 110, in other cases applications provide optional or specialized functionality, and may be supplied by third party vendors or the device manufacturer.

Finally, with respect to informational data, e.g., program parameters and process data, this non-executable information can be referenced, manipulated, or written by the operating system or an application. Such informational data can include, for example, data that are preprogrammed into the device during manufacture, data that are created by the device or added by the user, or any of a variety of types of information that are uploaded to, downloaded from, or otherwise accessed at servers or other devices with which the device is in communication during its ongoing operation.

The device 110 also includes an Artificial Intelligence engine (AI engine) 180, which is linked to the device input systems, e.g., the mic and camera, and is configured via coded instructions to recognize and interpret user voice or gesture inputs. The AI engine will be discussed at greater length later herein.

In an embodiment, a power supply 190, such as a battery or fuel cell, is included for providing power to the device 110 and its components. All or some of the internal components communicate with one another by way of one or more shared or dedicated internal communication links 195, such as an internal bus.

In an embodiment, the device 110 is programmed such that the processor 140 and memory 150 interact with the other components of the device 110 to perform certain functions. The processor 140 may include or implement various modules and execute programs for initiating different activities such as launching an application, transferring data, and toggling through various graphical user interface objects (e.g., toggling through various display icons that are linked to executable applications). For example, the AI engine is implemented by the processor 140 in an embodiment.

Applications and software are represented on a tangible non-transitory medium, e.g., RAM, ROM or flash memory, as computer-readable instructions. The device 110, via its processor 140, runs the applications and software by retrieving and executing the appropriate computer-readable instructions.

Figure 2:
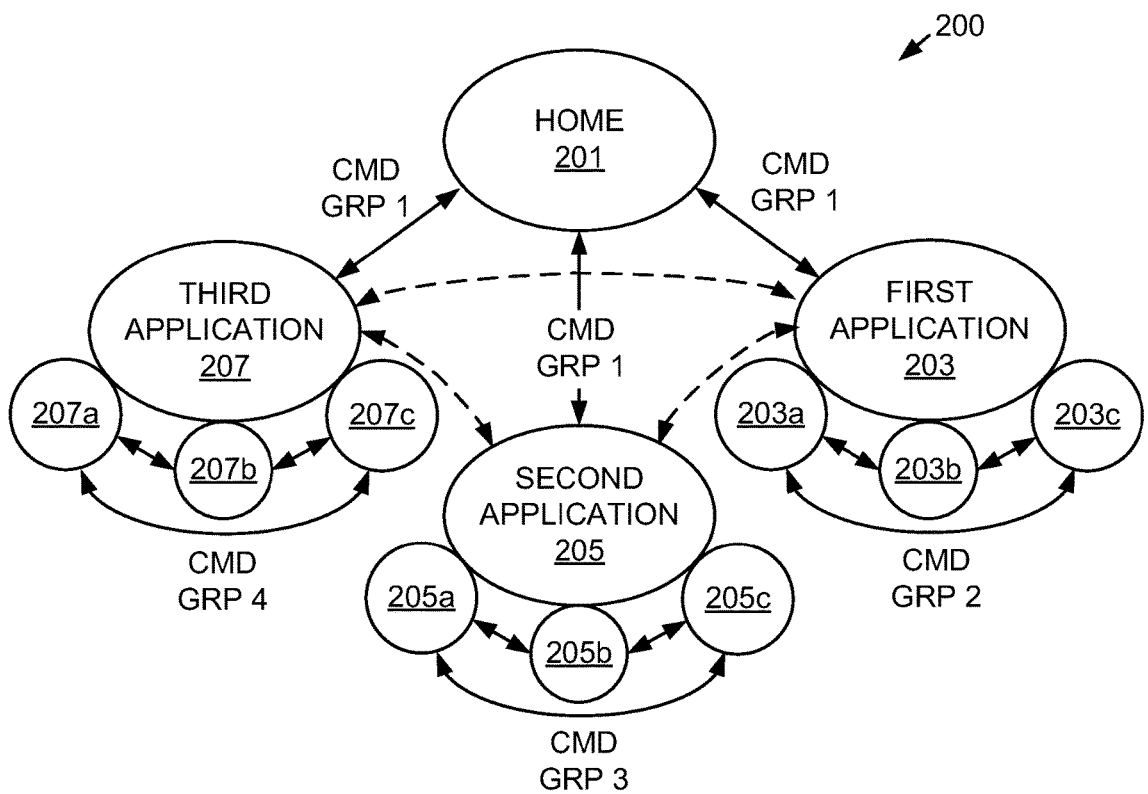
FIG. 2 is a device state diagram in accordance with an embodiment of the disclosed principles.

Turning to FIG. 2, this figure illustrates a state diagram showing the device states and transitions there between as they relate to trigger and command input and response. For the purpose of providing examples, the state chart 200 of FIG. 2 illustrates four states, namely a home state 201, a first application state 203, a second application state 205 and a third application state 207.

In the home state 201, the device is on and awaits user input, but an application is not being actively used on the device. In this state 201, the device may or may not be locked. In the first application state 203, the device is in use and a first application is the primary application, i.e., the user interface and display for the first application are shown on the device display screen. Similarly, in the second 205 and third 207 application states, a second or third application respectively is the primary application on the device at that time. The user is able to switch from the first context (Home state 201) to another context (e.g., First Application state 203) via a first group of triggers and commands that are native to the device or operating system of the device (the default triggers and commands).

From each application state 203, 205, 207 the user may be able to switch to another context 203, 205, 207 through the use of the first group of commands. However, the user is also able, in an embodiment, to switch between multiple application-specific states 203a, 203b, 203c or 205a, 205b, 205c or 207a, 207b, 207c by using application-specific commands (e.g., group 2 commands, group 3 commands or group 4 commands respectively).

In addition, it is possible in various embodiments to switch directly between applications states 203, 205, 207 via another group of commands (execution of which is shown in dashed transitions) rather than first transitioning to the home state 201 via a Group 1 command and then using another Group 1 command to transition to the desired application. In this way, the user is able to switch directly from a foreground application to an application running in the background.

As noted above, the operational context of a device describes the device usage in terms of identifying the currently active application, other active apps running in the background, other existing apps on the device or available to the device and downloadable apps and content, as well as the capabilities of the device (such as connectivity, ability to relay information, other devices connected to etc.).

For the purpose of the disclosure, operational context primarily refers to the internal state or capability of the device itself, rather than factors concerning the external environment, i.e., device location/orientation, motion state, surrounding physical conditions. However, another example of operational context is an app or content that is not presently on the device, but is downloadable upon request of the device. This may also be considered as part of the device's operational context even though it is technically located outside of the device.

In an embodiment of the disclosed principles, the device uses a set of pre-defined (or user-defined or learned) context-specific triggers. For example, in camera mode the device may support a pre-defined trigger utterance such as "camera," in order to trigger action. This is in addition to a device's default trigger such as: "OK Droid Now." Once out of camera context, a different trigger will be used, or the device will react to the default trigger "OK Droid Now" only.

In a further embodiment, multiple triggers allow other background apps to be invoked more quickly. For example, with the map app on, and the camera app running in the background, the user may utter the trigger "camera" in this embodiment in order to switch the current app context from map to camera. This may by-pass one or more other mechanisms for invoking the camera, but does not necessarily preclude such other mechanisms. For example, the camera app may otherwise be entered by the user uttering "OK Droid Now" followed by "Start Camera." Within this embodiment, the context specific triggers are available for the active apps, and unless an app is active or in background, the full/default device trigger would be needed to access it. In this embodiment, both pre-defined and user-defined trigger can be utilized.

In an alternative embodiment the device uses a set of pre-defined (or user-defined) context-specific commands, thus eliminating a need for triggering. In this embodiment, once an app is active (even in background) it is controllable directly using a supported command, thus bypassing the trigger. As an example of such operation, once the camera app is on, the user may issue a verbal command "take picture" (or "turn flash on"), rather than "OK Droid Now", followed by "take photo").

There may be command ambiguity due to commands that are common for multiple apps. These are resolved in an embodiment by sending the command to the active app, or by another mechanism such as "last app used", etc. For example, the command "find Schaumburg library", within the context of maps and browser active may indicate either that the user needs directions to the library or that the user needs to view the library web-site in order to access the catalogue. Ambiguity can also be resolved by prompting the user for further information. In an embodiment, context-specific commands are not valid to invoke action unless the specific app/target for the command is active and ready to act.

In another embodiment, a combination of pre-defined (or user-defined) trigger-command combinations is used to improve control over the device. Such trigger-command combinations are not active unless the device is in the proper context. In that case, they become active in order to provide an easier alternative for device control in addition to the default trigger/command combination. For example, if the maps and browser apps are both running or in the background on a device, the user trigger-command "maps, find Schaumburg library" will bring up the location and directions to the library from the user's current location, while "browser, find Schaumburg library" will issue a web search for the library and launch the web site on top of search results (together with its physical address). This embodiment is also free of command ambiguity and as such eliminates the need to resolve ambiguity using other mechanisms.

In a further embodiment with respect to any of the foregoing embodiments, a mechanism in provided to inform the user of the device's ability to utilize contextual commands or triggering. This may be implemented during the initial voice control or other set-up phase of the device. It may be implemented visually by flashing information on the screen, or audibly via prompting of the contextual command/trigger list during app launch or usage. It may also be implemented by defining a default "help" trigger, which is related to overall device usage (or contextual capabilities of the device control mechanisms). This informs the user in both cases of any vocal as well as non-vocal trigger/commands. Both types of commands can be described using one or both of visual and audible cues.

Figure 3:
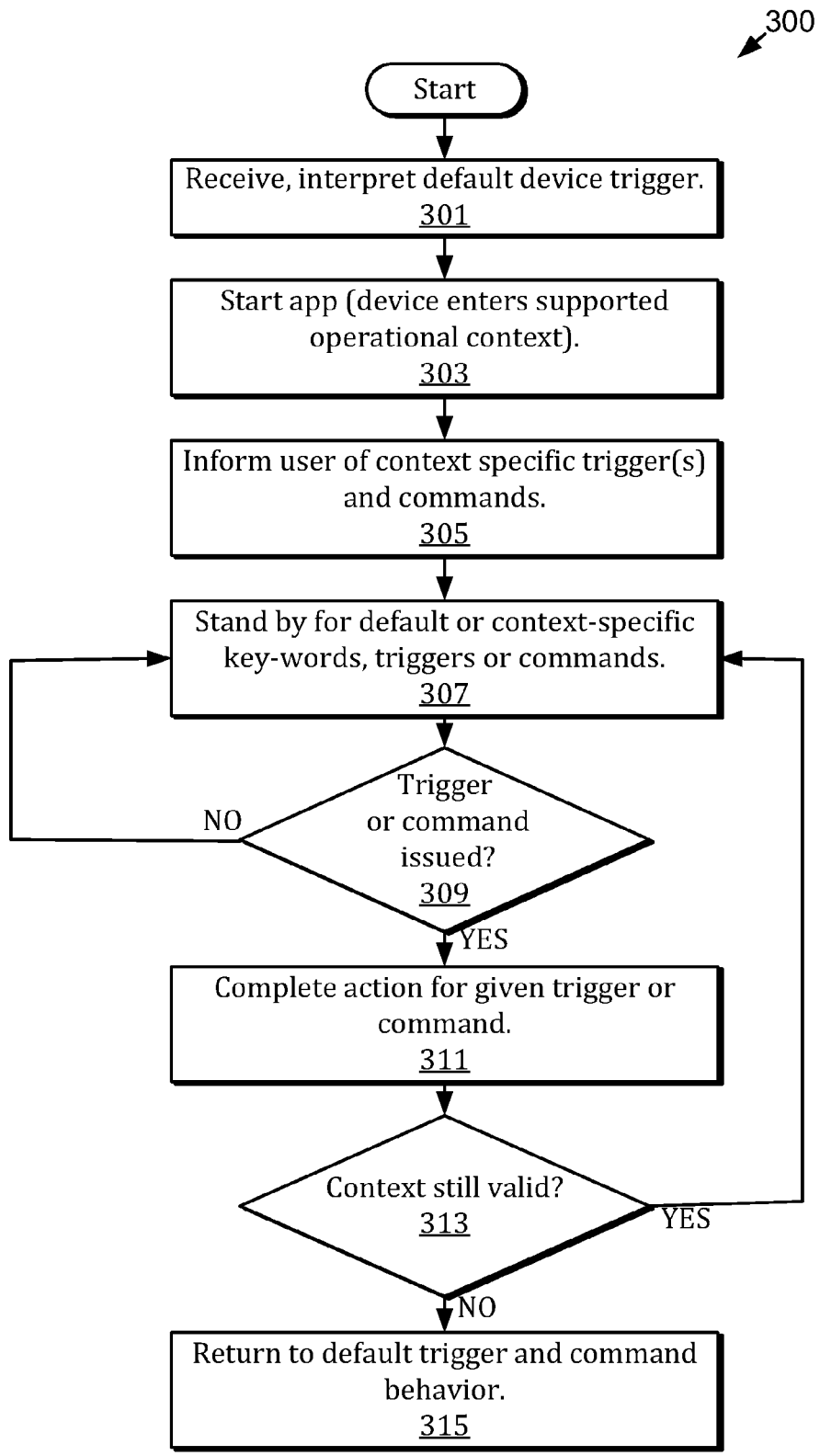
FIG. 3 is flow chart of a process for device control in accordance with an embodiment of the disclosed principles.

Although various methodologies may be used to implement embodiments of the disclosed principles, the flow chart of FIG. 3 illustrates one example process. In the illustrated process 300, the device is initially in a state such as the home state 201 in which it receives and recognizes the default trigger at stage 301. Once the device enters a new context at stage 303, e.g., by starting an app for which application-specific triggers and commands are supported, the user is informed at stage 305 of the specific triggers and commands and the system awaits receipt at stage 307 of any of the specific triggers or commands.

If a context-specific or default trigger or command is received at stage 309, the device performs the action indicated by the trigger or command. If the context continues to be valid, that is, if the device remains in the app as determined at stage 313, the device returns to stage 307 to await a new context-specific trigger or command. If instead the operation context changes, as determined at stage 313, then the device returns to the default context or whatever context has been invoked instead of the current context. For example, the user may quit the current app with no other app waiting or may switch from the current app to another.

In an embodiment, the contextual information is used as a learning aid for the AI engine 180 to improve recognition and execution of context-specific triggers or commands. For example, the AI engine will learn that the user often searches within the map app for the location of the user's favorite donut store (for example "Bob's Donuts"). When in the proper context, i.e., with the maps app being active, the user's utterance of "Bob's Donuts" will trigger a map search or a prompting action by the device.

Thus, it can be seen that in an embodiment of the disclosed principles, the AI engine improves the device's contextual control capability by actively monitoring and learning from user behavior and subsequent user action. Indeed, the AI engine can infer new triggers and commands based on repeated receipt of the trigger or command followed by similar user activities. In a further embodiment, the AI engine allows the device to predict user behavior after a sufficient period of monitoring. For example, the device may assign a higher priority to verbal content that resembles a known command.

In a further embodiment, data collection is used to improve word-models used by the AI engine to recognize contextual commands, improving command recognition under challenging conditions, e.g., high ambient noise conditions. The AI engine may also actively increase its known vocabulary by flagging and modeling utterances within a given context that are similar to known context-specific commands. For example, the utterance "take selfy" may be an initially undefined command that the AI engine learns to use to trigger capture of picture from the front camera, embedding relevant content such as time/location stamp, and posting picture on social networks all in one sequence.

The ability to quickly learn user behavior is heightened in an optional embodiment by aggregating AI content across users and devices, so that the user experience incrementally improves over time for an entire population of users. In this way, an initially undefined context-specific command such as "take selfy" may become usable on a given device even though there has not been sufficient user time on that device for the AI engine of the device to independently learn the command. This is similar to the way in which earthen footpaths are created by the combined activity of many users walking the same shortcut. Once the footpath exists, a user who has never walked the path before can see and follow the now-worn path.

Figure 4:
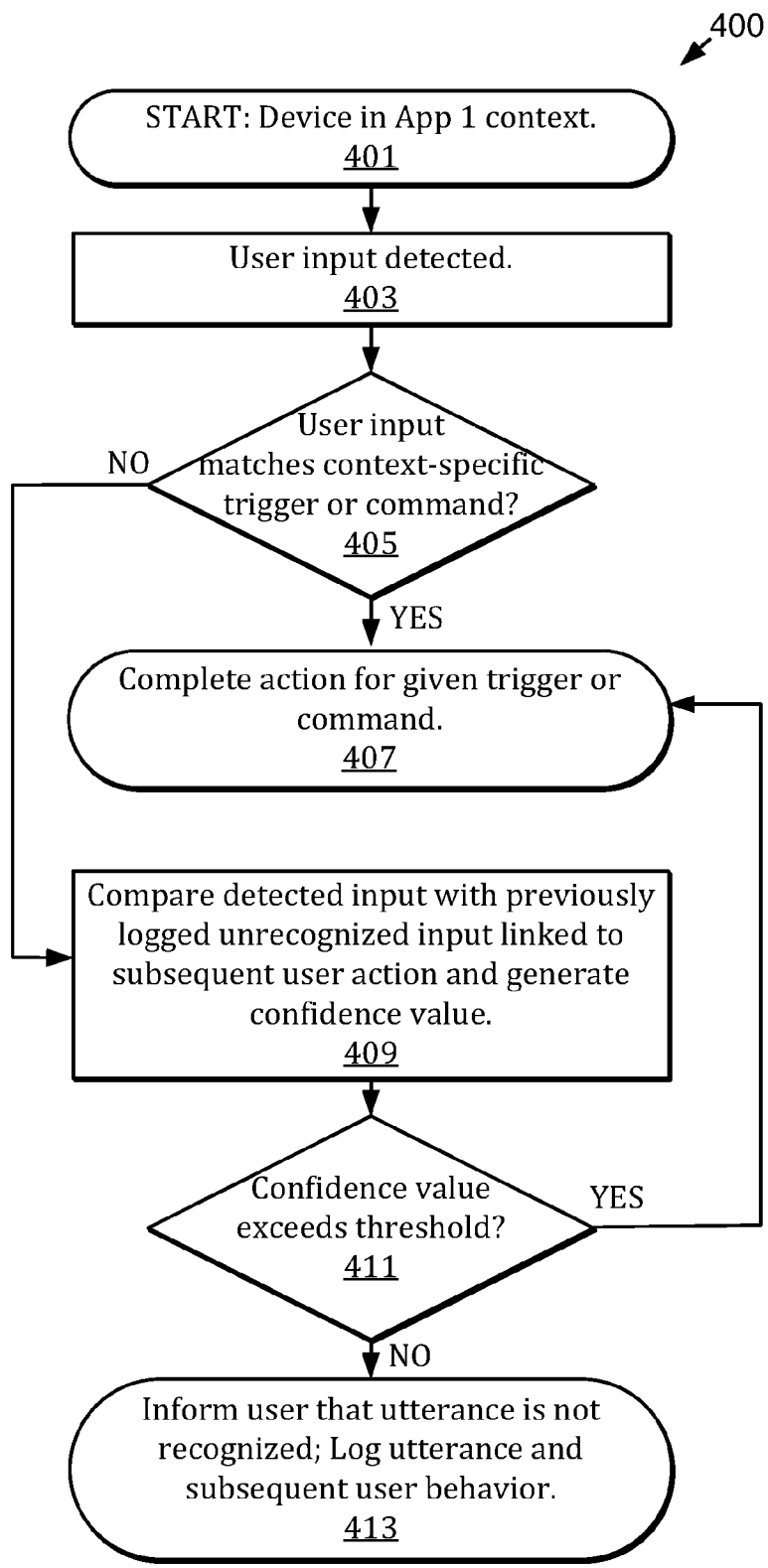
FIG. 4 is a flow chart of a process for user input interpretation in accordance with an embodiment of the disclosed principles.

Taking certain of the above principles in combination with the general flow of FIG. 3, a more specific example of use is shown in the flowchart of FIG. 4. The illustrated process 400 begins at stage 401 with the device residing in an App 1 context, which supports certain predefined triggers and commands. At stage 403 of the process 400, the device detects user input, such as an utterance.

Initially the AI engine compares the input to the predefined context-specific triggers and commands at stage 405, and if the input matches a known trigger or command, then the appropriate action is taken by the device at stage 407. Otherwise, the process 400 flows to stage 409, whereupon the AI engine compares the detected input with previously logged unrecognized user input linked to subsequent user action. Also, at stage 409, the AI engine generates a confidence value associated with the match of the detected input to an instance of previously logged input.

If the confidence value exceeds a predetermined threshold, e.g., 96%, then the AI engine causes the device to execute the subsequent user action linked to the logged instance at stage 407. Otherwise, the AI engine causes the device to inform the user that the utterance is not recognized, and to log the utterance and associated user behavior for later analysis and comparison.

It will be appreciated that the predefined triggers and commands in process 400 may include both specifically defined commands (by user or provider) and commands learned or defined via prior AI analysis. Moreover, in an embodiment, the AI engine uses locally predefined triggers and commands as well as triggers and commands stemming from AI analysis on other devices. Similarly, when logging unrecognized input and associated activities, such data may be logged locally or to shared storage, e.g., a server.

It will be appreciated that a system and method for improved user input execution have been disclosed herein. However, in view of the many possible embodiments to which the principles of the present disclosure may be applied, it should be recognized that the embodiments described herein with respect to the drawing figures are meant to be illustrative only and should not be taken as limiting the scope of the claims. Therefore, the techniques as described herein contemplate all such embodiments as may come within the scope of the following claims and equivalents thereof.

We claim:

1. A portable electronic communication device comprising:
 a user input receiver;
 a user application running on the device; and
 a processor that receives and interprets user input from the user input receiver by comparing the received user input to one or more application-specific user input options when the user application is active and comparing the received user input to one or more device-specific user input options when the user application is running in background and executing an action associated with any input option matching the received user input.

2. The portable electronic communication device in accordance with claim 1, wherein the one or more application-specific user input options include at least one predefined user input option.

3. The portable electronic communication device in accordance with claim 1, wherein the one or more application-specific user input options include at least one user-defined user input option.

4. The portable electronic communication device in accordance with claim 1, wherein the one or more application-specific user input options include at least one application-specific trigger and at least one application-specific command, wherein the application-specific trigger is interpreted to place the portable electronic communication device in a state in which it is receptive to receipt of the at least one application-specific command.

5. The portable electronic communication device in accordance with claim 1, wherein the one or more application-specific user input options include at least one application-specific command learned based on prior user input.

6. The portable electronic communication device in accordance with claim 1, wherein the one or more application-specific user input options include at least one user input option that is both a trigger and a command.

7. The portable electronic communication device in accordance with claim 1, wherein the processor also causes a list of acceptable application-specific triggers and commands to be conveyed to the user upon launching an application.

8. The portable electronic communication device in accordance with claim 1, wherein the processor prioritizes keywords depending on device operational context.

9. The portable electronic communication device in accordance with claim 8, wherein the processor monitors keywords to determine a characteristic of at least one word model based on the device operational context.

10. The portable electronic communication device in accordance with claim 1, further including a second application running on the device, and wherein the processor recognizes a command to switch from the first application to the second application based on the device operational context.

11. The portable electronic communication device in accordance with claim 1, wherein the user input receiver comprises at least one of a textual input device, a microphone, a camera, a thermal sensor and an infrared sensor.

12. The portable electronic communication device in accordance with claim 1, wherein the one or more application-specific user input options include a command option that is one of voiced and non-voiced.

13. A method of controlling operation of a portable electronic communication device comprising:
   receiving user input from a user of the device;
   selecting a set of user input options based on an operational context of the device, wherein each user input option is associated with a device action, and wherein the operational context of the device includes an identification of at least one running application and whether the application is running in the background;
   mapping the received user input to a matching user input option within the selected set of user input options, wherein the selected set of user input options includes one or more device-specific user input options when the user application is running in background; and
   executing the device action associated with the matching user input option.

14. The method in accordance with claim 13, wherein the selected set of user input options includes at least one predefined user input option.

15. The method in accordance with claim 13, wherein the selected set of user input options includes at least one user-defined user input option.

16. The method in accordance with claim 13, further comprising monitoring user input to learn at least one learned user input option and wherein the selected set of user input options includes the at least one learned user input option.

17. The method in accordance with claim 13, wherein the selected set of user input options includes at least one application-specific trigger and at least one application-specific command, wherein the application-specific trigger is interpreted to place the portable electronic communication device in a state in which it is receptive to receipt of the at least one application-specific command.

18. The method in accordance with claim 17, wherein the selected set of user input options includes at least one user input option that is both a trigger and a command.

19. The method in accordance with claim 13, wherein the operational context of the device further includes an identification of a second running application and wherein the selected set of user input options includes at least one user input option to switch from the first application to the second application.

20. A method of controlling operation of a portable communication device comprising:
   determining an operational context of the device, the operational context including an identification of at least one running application and an indication of whether the at least one running application is active or is running in the background;
   determining an application-specific set of user input options for each of the at least one running applications;
   selecting an applicable set of user input options based on the device operational context, wherein the selected applicable set of user input options includes one or more device-specific user input options when the user application is running in background; and
   receiving user input and interpreting the received user input based on the applicable set of user input options.

* * * * *